G. A. CAMPBELL.
SIGNALING CIRCUIT.
APPLICATION FILED AUG. 18, 1917.

1,254,117.

Patented Jan. 22, 1918.
3 SHEETS—SHEET 1.

INVENTOR.
G. A. Campbell
BY Thomas D. Lockwood
ATTORNEY

G. A. CAMPBELL.
SIGNALING CIRCUIT.
APPLICATION FILED AUG. 18, 1917.

1,254,117.

Patented Jan. 22, 1918
3 SHEETS—SHEET 2.

INVENTOR.
G. A. Campbell
BY Thomas D. Lockwood
ATTORNEY

UNITED STATES PATENT OFFICE.

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK.

SIGNALING-CIRCUIT.

1,254,117.  Specification of Letters Patent.  Patented Jan. 22, 1918.

Application filed August 18, 1917. Serial No. 136,913.

*To all whom it may concern:*

Be it known that I, GEORGE A. CAMPBELL, residing at Montclair, in the county of Essex and State of New Jersey, have invented certain Improvements in Signaling-Circuits, of which the following is a specification.

This invention relates to circuit arrangements for signaling systems wherein signals may be either transmitted from or received at the same station. In its more specific aspects this invention is embodied in a subscriber's telephone station, hereinafter termed, in accordance with common usage, a substation, and more particularly in the combination of a substation and a telephone line. Its object is to provide a signaling circuit arrangement which in coöperative combination with a similar and equal communicating arrangement or station shall deliver the maximum amount of energy to the receiving apparatus of said communicating station or arrangement. A further object is to provide an arrangement such that the receiving apparatus is protected from interference by the transmission energy originating at the same station. In other words its object is to provide signaling means characterized by the maximum possible ratio of received to transmitted energy and further characterized by the absence of side tone.

The object of the invention is attained, in its specific aspect, by providing a substation consisting of transmitter, receiver, auxiliary resistance, and a transformer having a plurality of windings which, in combination with a telephone line, shall satisfy the following fundamental requirement: Given two identical substations designed for invariable two-way communication, and connected by a line of given impedance and length, the amount of energy absorbed by the receiver at the receiving station shall be the maximum part of the total telephonic energy developed by the transmitter at the transmitting station, consistent with invariable two-way communication, and, as hereinafter explained, consistent with a desirable amount of discrimination against disturbing line noise. This fundamental requirement may be stated in terms of the following subordinate requirements which are necessary for its satisfaction: (1) The transmitter and receiver shall be conjugate, that is there shall be negligible side tone in the receiver in consequence of the actuation of the transmitter by sound waves; (2) the line and auxiliary resistance shall be conjugate in order that none of the energy absorbed by the substation from the line shall be wasted in said auxiliary resistance; (3) for a given line having a definite impedance the telephonic energy delivered by the transmitter shall be a maximum; (4) the amount of energy delivered by the line to the substation shall be a maximum, in other words the impedance of the substation as seen from the line shall be equal to the impedance of the line; (5) at a small sacrifice of efficiency it shall be possible to discriminate effectively against disturbing line noise as distinguished from the telephonic signals from the communicating station.

A substation satisfying the above-mentioned requirements is ideal in that its over-all efficiency from transmitter of one substation to receiver of the communicating substation is a theoretical maximum which cannot be exceeded by any invariable substations whether satisfying the requirement of transmitter and receiver conjugacy or not. It is further ideal in the sense that a minimum number of elements is employed since at least one auxiliary element is necessary to secure freedom from side tone.

It might be inferred that the addition of an auxiliary resistance element, necessary as it is to secure freedom from side tone, would at the same time necessarily reduce the efficiency of the substation since energy is unavoidably wasted in said auxiliary resistance. That this is not the case and that the efficiency of the substation of my invention is a theoretical maximum which cannot be exceeded by any two-way substation whether with or without side tone, the following considerations will show. The simplest form of substation for invariable two-way communication is that in which the receiver and transmitter are connected in series with each other across the line. In such an arrangement the over-all efficiency is a maximum when the resistance of the receiver is equal to that of the transmitter. When this condition is satisfied obviously fifty per cent. of the energy delivered by the line to the substation is wasted in the transmitter and fifty per cent. of the energy delivered by the transmitter is wasted in the receiver. Further such an arrangement labors under the disadvantage of full side tone. In the substation of my invention fifty per cent. of the energy delivered by the line to the substation is wasted in the transmitter but none in the auxiliary resistance if said auxiliary resistance and said line are conjugate; hence the efficiency is as great as that of the simple series substation. When transmitting no energy is wasted in the receiver but fifty per cent. of the energy delivered by the transmitter is wasted in the auxiliary resistance. The transmitting efficiency is therefore also a theoretical maximum and neither transmitting nor receiving efficiency is reduced by the addition of the auxiliary resistance which is necessary to secure freedom from side tone. The foregoing consideration will serve to explain the desirability of having the line and auxiliary resistance conjugate as well as the transmitter and receiver.

In my present invention I provide a substation comprising transmitter, receiver, auxiliary resistance and transformer and so proportion said component elements and so relate them to a telephone line and to each other that, in combination with said telephone line, said substation satisfies all of the foregoing requirements.

I have discovered that the above-mentioned requirements may be satisfied by a large number of arrangements employing the minimum number of elements and all equally efficient and without side tone. While theoretically all these arrangements are equally good, practical considerations make certain arrangements preferable.

My invention will now be fully understood by reference to the accompanying drawing in which.

It will be clear from an inspection of the design formulæ hereinafter set forth that the winding ratios $r$ and $r'$ may, in general, be either positive or negative, depending upon the values of the line and transmitter resistances. If, therefore, for any particular design one or both of the winding ratios results in a negative value, it is to be interpreted as meaning that the relative direction of winding of the coils whose winding ratio is negative must be the reverse of that shown in the diagram.

In order to illustrate the scope of my invention and elucidate the principles on which all specific embodiments rest, a general theoretical discussion will now be given which applies to all substations satisfying the requirements heretofore stated in this specification. In this discussion and the equations and formulæ included in this specification the subscripts 1, 2, 3 and 4 will refer to transmitter, receiver, auxiliary resistance and line respectively. Thus $I_1$, $I_2$, $I_3$, $I_4$ will denote the currents flowing in transmitter, receiver, auxiliary resistance and line respectively, while $R_1$ will denote the resistance of the transmitter, $R_2$ the resistance of the receiver, etc.

Consider a substation consisting of transmitter, receiver, auxiliary resistance and appropriate transformer windings, connected to a line of given impedance. In practice the line connects two similar and equal substations between which communication is established. It is a well known principle that if a terminal impedance is connected to a source of electromotive force through a line of impedance $$Z = R_4 + iR'_4,$$

where $R_4$ is the resistance and $R'_4$ the reactance component of the impedance, the terminal impedance must be $R_4 - iR'_4$ for maximum absorption of energy. In particular if the line impedance has no reactance component, the impedance of the terminal arrangement as seen from the line should be equal to the resistance component of the impedance of the line. The condition, then, that the substation shall have maximum energy absorption from the line is that its impedance, as seen from the line, shall be equal to the line impedance.

The significance of the foregoing statement may be explained by reference to Fig. 2, as follows: Let the substation be disconnected from the line and let the impedance of the substation be measured across terminals $a$ and $e$. Then the impedance so measured shall be equal to the impedance of the line. With the line terminated at each end by a substation satisfying this condition, the line may be replaced, as regards transmission from either substation, by an impedance element of resistance equal to the impedance of the line. Any reactance effect, which is in practice small, may be eliminated by neutralizing reactance and, therefore, need not be considered. The condition, then, that the substation have maximum energy absorption from the line is that its impedance as seen from the line be a pure resistance of value equal to the impedance of the line. This condition is evidently equivalent to the following requirement; let an electromotive force be impressed on the substation terminals through a resistance equal to the impedance of the line; then the energy consumed in the substation shall be equal to the energy consumed in said resistance.

Further, line and auxiliary resistance are conjugate by requirement (2), as hereinbefore stated, or in other words, the auxiliary resistance is connected to points of equal potential with respect to an electromotive force applied to the line terminals. Moreover, the impedance of the substations as seen from the line should be equal to that of the line. Let, then, an electromotive force $E_4$ be impressed through a resistance $R_4$ on a substation whose transmitter and receiver resistances are $R_1$ and $R_2$ respectively, and let the resultant currents in line, transmitter and receiver be $I_4$, $I_1$ and $I_2$ respectively, the impedance across the substation terminals must be $R_4$ as seen from the line and the total resistance in series with $E_4$ is $2R_4$, and since the current in the line is $I_4$, it follows that $$\frac{E_4}{2R_4} = I_4$$

The total energy consumed may then be expressed by the formula $$I_4^2 R_4 + I_1^2 R_1 + I_2^2 R_2 = I_4 E_4 = \frac{E_4^2}{2R_4}$$

Since the energy consumed by the substation is equal to that consumed by the resistance $R_4$ and is therefore one-half of the total energy consumed, it follows that requirement 4 may be formulated by the following:

$$R_4 (I_4)^2 = (I_2)^2 R_2 + (I_1)^2 R_1 = \frac{(E_4)^2}{4R_4} \quad (1)$$

This equation states that the energy consumption in the resistance $R_4$ is equal to that in the substation, and that the substation is equivalent, as seen from the line, to a resistance of value $R_4$.

Similarly, if transmitter and receiver are conjugate the condition that the transmitter shall have its maximum output to line and auxiliary resistance may be formulated as follows: Let an electromotive force $E_1$ in the transmitter produce currents $I_1$, $I_4$ and $I_3$ in transmitter, line and auxiliary resistance. Then, for maximum output it follows that $$(I_1)^2 R_1 = (I_4)^2 R_4 + (I_3)^2 R_3 = \frac{(E_1)^2}{4R_1} \quad (2)$$

Equation (2) is the analogue of equation (1) and may be interpreted as follows by reference to Fig. 2. Let the transmitter be disconnected from the terminals $b$ and $c$ and let the impedance be measured across said terminals. Then if equation (2) is satisfied the impedance so measured is equal to the impedance of the transmitter. In other words, the impedance of the combination as seen from the transmitter is equal to that of the transmitter itself.

As hereinafter shown for the particular embodiments of my invention, equation (2) follows as a consequence of the conditions of double conjugacy and equation (1). Therefore the foregoing four requirements impose but three restrictions on the substation.

To complete the general discussion it remains to consider the energy division between receiver and transmitter when receiving, and between line and auxiliary resistance when transmitting. Let $W_0$ be the total amount of telephonic energy developed by the transmitter at the transmitting substation; then, by equation (2), $1/2 W_0$ is the amount of energy delivered to line and auxiliary resistance. Let the amount of energy taken by the auxiliary resistance be $x$ times that taken by the line, then the amount of energy taken by the line is $$1/2 W_0 \frac{1}{(1+x)}$$

so that the transmitting efficiency is measured by $$\frac{1}{(1+x)} \quad (3)$$

Of the total energy delivered to the receiving substation, let the transmitter absorb $y$ times that absorbed by the receiver; then the receiving efficiency is measured by $$\frac{1}{(1+y)} \quad (4)$$

The over-all efficiency from transmitter of one station to receiver of communicating station is clearly proportional to the product of the transmission efficiency and receiving efficiency; therefore the over-all efficiency is by formulæ (3) and (4):

$$\left(\frac{1}{1+x}\right)\left(\frac{1}{1+y}\right)$$

If $x$ and $y$ were independent, clearly the over-all efficiency would be a maximum for $x=y=0$. For all substations embodying the principles of my invention it may be readily shown, however, that $x$ and $y$ are connected by the relation $xy=1$. Eliminating $x$ from the above formula by means of this relation, the expression for the over-all efficiency becomes $$\frac{y}{(1+y)^2} \quad (5)$$

In order to demonstrate the above statement, namely that $xy=1$, designate the elements or branches T, R, X and L by 1, 2, 3, and 4, respectively, and let 1 and 2 be conjugate and also 3 and 4 be conjugate. Further it will be assumed for an electromotive force in branch 4, equation (1) is satisfied while for an electromotive force in branch (1), equation (2) is satisfied. Let $S_{11}$ denote the current produced in branch or element 1 by a unit electromotive force in branch 1, $S_{12}$ the current produced in branch 2 by a unit electromotive force in branch 1, etc. Then by the conjugacy of branches 1 and 2 and branches 3 and 4, it follows that $$S_{12}=S_{34}=0$$

Also by equation (1)

$$(S_{44})^2 R_4 = (S_{42})^2 R_2 + (S_{41})^2 R_1 = \frac{1}{4R_4} \quad (1')$$

and by equation (2)

$$(S_{11})^2 R_1 = (S_{13})^2 R_3 + (S_{14})^2 R_4 = \frac{1}{4R_1} \quad (2')$$

Now it is a fundamental principle which is deducible from elementary algebra, that $S_{41}=S_{14}$. That is, the current set up in branch 1 by a unit electromotive force in branch 4 is equal to the current set up in branch 4 by a unit electromotive force in branch 1. Multiplying equation (1') by $R_4$ and equation (2') by $R_1$ and subtracting it follows that:

$$(S_{42})^2 R_2 R_4 = (S_{13})^2 R_1 R_3 \quad (a)$$

Now in accordance with the notation adopted in this specification, the energy consumed in branch 3 is $x$ times that consumed in branch 4 when an electromotive force acts in branch 1; therefore $$(S_{13})^2 R_3 = x(S_{14})^2 R_4 \quad (b)$$

Also the energy consumed in branch 1 is $y$ times that consumed in branch 2 when an electromotive force acts in branch 4; whence $$(S_{14})^2 R_1 = y(S_{24})^2 R_2 \quad (c)$$

Multiplying (b) and (c)

$$(S_{13})^2 R_1 R_3 = xy(S_{24})^2 R_2 R_4 \quad (d)$$

From (a) and (d) it follows at once that $xy=1$.

Obviously the expression given by formula (5) is a maximum when $y=1$. This means that for a given amount of telephonic energy developed in the transmitter at the transmitting substation a maximum amount is usefully delivered to the receiver at the receiving substation connected by the line, when $y=1$. Since the maximum amount of energy in the receiver is the prime desideratum of telephony, it would appear that the substation should be designed to make $y=1$. Another consideration, however, modifies this conclusion somewhat, namely, the effect of line noise. Since the line noise originates in the line the amount delivered to the receiver is proportional to $$\frac{1}{1+y}$$

(see equation 4) while the amount of energy delivered from the transmitter of the communicating station is proportional to $$\frac{y}{(1+y)^2}$$

(see equation 5). The ratio of the latter to the former is $$\frac{y}{1+y},$$

and this increases as $y$ increases beyond unity. It will be clear, then, that if $y$ is made greater than unity the substation discriminates against line noise as compared with the signals it is desired to receive. The amount of discrimination desired depends of course on the amount of line noise present. For conditions occurring in practice I have found by experiment that a desirable value for $y$ is 1.4. With this value of $y$ the over-all efficiency is reduced 2.8% below the maximum for $y=1$, while the receiving efficiency alone is reduced 16.6%. It is thus seen that a good degree of discrimination against line noise is obtained with a small loss in over-all efficiency.

The above considerations as to over-all efficiency and discrimination against line noise may be formulated as $$R_1(I_1)^2 = yR_2(I_2)^2 \quad (6)$$

for an electromotive force inserted in the line. In this equation $y$ is to have a value lying between 1 and 1.5 preferably.

Figure 2:
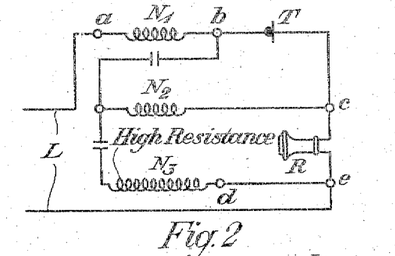
Figs. 2, 6, 10, 14, 18 and 22 are circuit diagrams showing the arrangement of the several forms of substations in greater detail.

Proceeding now to a description of the specific circuits, in Fig. 2 a substation is shown comprising a transmitter T, a receiver R, a line L and an induction coil consisting of three windings $N_1$, $N_2$ and $N_3$. The transmitter T is connected in series with the winding $N_1$ between the terminals $a$ and $c$. Winding $N_2$ is connected between terminals $b$ and $c$ and winding $N_3$ is connected between terminals $b$ and $e$, while the receiver R is connected between terminals $c$ and $e$. The line L is connected between terminals $a$ and $e$. Windings $N_1$ and $N_2$ are of negligible resistances. Winding $N_3$, however, is a high resistance winding, the resistance of said winding serving to balance the line L. In some instances it may be desirable to arrange the resistance as a separate element from the winding $N_3$, such an arrangement being indicated in Figs. 3 and 4 in which the auxiliary resistance X is connected in series with a winding $N_3$ of negligible resistance between terminals $b$ and $e$. Condensers may be inserted in the circuit as indicated in Fig. 2, in order to determine the flow of direct current, so that direct current from a distant central office will flow over the line to terminal $a$, through the winding $N_1$, transmitter T, receiver R, terminal $e$, and back over the line.

Figure 3:
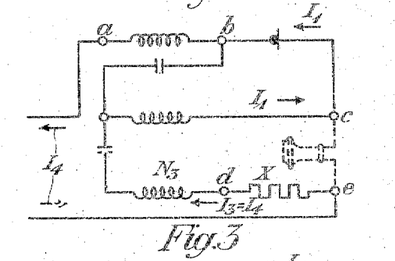
Figs. 3, 7, 11, 15, 19 and 23 are circuit diagrams indicating the relative direction of current flow in the several circuits shown in Figs. 2, 6, 10, 14, 18 and 22, respectively, during transmission, the dotted lines indicating elements through which no current flows.

The operation of the substation of Fig. 2 during transmission will be clear from Fig. 3 in which the arrows indicate the direction of current flow and the dotted lines indicate elements through which no current flows. Since no current flows through the receiver during transmission, the transmitter T is in a local series circuit with the winding $N_2$. The actuation of the transmitter varies the current flowing in the circuit of the transmitter, its action being equivalent to setting up in the transmitter a variable electromotive force which causes an alternating current to flow. At a given instant of time, therefore, a current $I_1$ flows from terminal $c$ through the transmitter to terminal $b$ and thence back through the winding $N_2$ to terminal $c$. An induced current $I_4$ equal to $I_3$ is thereby caused to flow from terminal $b$ through the winding $N_1$ over the line L to terminal $e$, through the auxiliary resistance X and winding $N$, back to terminal $b$. Potentials are induced in the transformer windings of such value and direction as to lower the potential of the point $d$ to the same potential as point $c$, so that no current flows through the receiver during transmission and the substation is, therefore, anti-side tone.

Figures 4, 8:
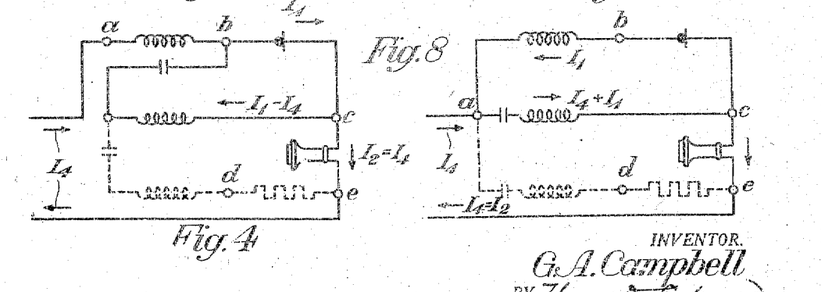
Figs. 4, 8, 12, 16, 20 and 24 are similar diagrams indicating the relative direction of current flow during reception. In the above diagrams the direction of winding of the transformer coils and the direction of current flow as indicated are symbolical and only hold true for particular values of the elements of the substation.

The action when receiving is indicated in Fig. 4 in which the arrows indicate the relative direction of current flow and the dotted lines indicate elements through which no current flows. Since no current flows through the auxiliary resistance X, the receiver and line are in a series circuit and a potential applied to the line causes a current $I_4$ equal to $I_2$ to flow from terminal $e$, through the receiver R, over the line L to the terminal $a$, through the winding $N_1$ to the terminal $b$. A current $I_1=I_4$ flows from terminal $c$ to terminal $b$ through the winding $N_2$. At terminal $b$ the two currents combine and a current $I_1$ flows from terminal $b$ through the transmitter to terminal $c$. Potentials are induced in the transformer windings of such value and direction that the terminal $d$ is reduced to the same potential as terminal $e$, so that no current flows through the auxiliary resistance. Consequently no energy loss occurs in the auxiliary resistance and while some energy is lost in overcoming the impedance of the transmitter, such loss is no greater than the transmitter loss in a standard substation.

Figure 1:
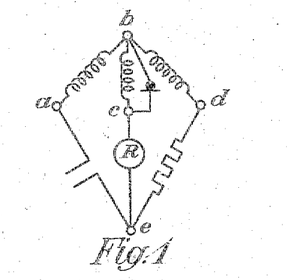
Figures 1, 5, 9, 13, 17 and 21 are schematic diagrams of six forms of substations in accordance with this invention, said diagrams being so arranged as to clearly indicate the equivalence of the different circuits.

The proportioning of the arrangement of Fig. 2, or its equivalent, Figs. 3 and 4, to satisfy the fundamental requirements of the substation of my invention, will now be given. In deriving the design formulæ, the resistances of the transformer windings will be ignored and the resistance of the winding $N_3$ in Fig. 1 will be treated as a separate element. It will be assumed further that there is no magnetic leakage between the transformer windings and that the self-impedances are very large compared with the impedances of any of the component elements of the substation or the impedance of the line. Experience has shown that these simplifying assumptions are justified and that the assumed conditions may be closely realized in practice by careful design.

To formulate the condition for conjugacy of transmitter T and receiver R, assume an electromotive force in the transmitter circuit and assume that the required condition of conjugacy is satisfied. In other words assume that the terminals of the receiver are at points of equal potential with respect to an electromotive force applied to the transmitter. Let $I_1, I_2, I_3, I_4$ denote the currents flowing in the transmitter, the receiver, auxiliary resistance and line, respectively, and $R_1, R_2, R_3$ and $R_4$ denote the resistances of the corresponding elements. The condition of conjugacy of the receiver with respect to the transmitter requires that no current flow through the receiver and hence $I_2=0$. It is also clear from Fig. 3 that during transmission $I_3=I_4$. Since the potential drop across the receiver must be zero, terminals $c$ and $e$ are at the same potential and the algebraic sum of the potential drops through the windings $N_2$ and $N_3$, and the IR drop through the auxiliary resistance X, must be zero. Designating the drop per turn as K and remembering that windings $N_2$ and $N_3$ oppose each other as regards a circuit in which they are serially included, the condition above stated may be expressed as follows:

$$Kn_2 - Kn_3 + I_3R_3 = 0$$

from which it follows that $$R_3I_3 = K(n_3 - n_2)$$

Furthermore since the line and auxiliary resistance are in a series circuit with the windings $N_1$ and $N_3$, the IR drop through the auxiliary resistance and the line must be equal to the drop through the windings $N_1$ and $N_3$. This condition may be expressed as follows:

$$R_4I_4 + R_3I_3 = Kn_1 + Kn_3$$

or $$(R_3 + R_4)I_3 = K(n_1 + n_3)$$

Combining this equation with the last preceding equation, we have $$\frac{R_3 + R_4}{R_3} = \frac{n_1 + n_3}{n_3 - n_2}$$

whence $$\frac{R_4}{R_3} = \frac{n_1 + n_2}{n_3 - n_2} \quad (7)$$

Also the algebraic sum of the ampere turns of the transformer windings must be zero so that $$I_1 n_2 = I_4(n_1 + n_3)$$

Since $I_3 = I_4$, this reduces to $$I_4 = I_3 = I_1 \frac{n_2}{n_1 + n_3} \quad (8)$$

Referring now to Fig. 4 which shows the condition when receiving, since no current flows through the auxiliary resistance X, terminals $d$ and $e$ must be at the same potential and consequently the drop through the winding $N_3$ must equal the algebraic sum of the drop through the winding $N_2$ and the IR drop through the receiver R. This condition may be expressed as follows:

$$Kn_2 + R_2I_2 = Kn_3$$

Furthermore since the transmitter is in a series circuit with the winding $N_2$, the algebraic sum of the drop through the winding $N_2$ and the IR drop through the transmitter must be zero, so that $R_1I_1 = Kn_2$. Combining these equations we have $$\frac{R_2 I_2}{R_1 I_1} = \frac{n_3 - n_2}{n_2}$$

Furthermore the algebraic sum of the ampere turns of the transformer windings must be zero so that $$n_1 I_4 = n_2(I_1 - I_4)$$

or $$n_2 I_1 = (n_1 + n_2) I_4$$

from which it follows that $$\frac{I_1}{I_4} = \frac{n_1 + n_2}{n_2}$$

Combining this equation with preceding equations and remembering that $I_2 = I_4$, we have $$\frac{R_2}{R_1} = \frac{(n_3 - n_2)(n_1 + n_2)}{n_2^2} \quad (9)$$

$$\frac{I_4}{I_1} = \frac{I_3}{I_1} = \frac{n_2}{n_1 + n_3} \quad (10)$$

Substituting the values given by equation 8 in equation 2, we have $$R_1 = (R_4 + R_3)\left(\frac{n_2}{n_1 + n_3}\right)^2 \quad (11)$$

Substituting the values given by equation 10 in equation 6, we have, $$R_2 = +\frac{1}{y}\left(\frac{n_1 + n_2}{n_2}\right)^2 R_1 \quad (12)$$

Collecting formulæ we have the following:

$$\frac{R_2}{R_1} = \frac{(n_3 - n_2)(n_1 + n_2)}{n_2^2}$$

$$\frac{R_3}{R_4} = \frac{n_3 - n_2}{n_1 + n_2}$$

$$R_2 = \frac{1}{y}\left(\frac{n_1 + n_2}{n_2}\right)^2 R_1$$

$$R_1 = (R_3 + R_4)\left(\frac{n_2}{n_1 + n_3}\right)^2$$

If, in the above formulæ, we write the ratio $\frac{n_1}{n_3}$ as $r$, and the ratio $\frac{n_2}{n_3}$ as $r'$, we have the following:

$$(a) \quad \frac{R_2}{R_1} = \frac{(1 - r')(r + r')}{r'^2}$$

$$(b) \quad \frac{R_3}{R_4} = \frac{1 - r'}{r + r'}$$

$$(c) \quad R_2 = \frac{1}{y}\left(\frac{r + r'}{r'}\right) R_1 \quad (13)$$

$$(d) \quad R_1 = (R_3 + R_4)\left(\frac{r'}{r + 1}\right)^2$$

From (a) and (c) we have $$\frac{R_2}{R_1} = \frac{(1 - r')(r + r')}{r'^2} = \frac{1}{y}\left(\frac{r + r'}{r'}\right)^2$$

whence $$(1 - r') = \frac{1}{y}(r + r') \text{ or } \frac{1 - r'}{r + r'} = \frac{1}{y} \quad (14)$$

Substituting this value in equation (b) of the above group, we get $$R_3 = \frac{1}{y} R_4 \quad (15)$$

Combining equation 15 with equation (d) above we have $$R_1 = R_4\left(1 + \frac{1}{y}\right)\left(\frac{r'}{r + 1}\right)^2$$

or $$\left(\frac{r + 1}{r'}\right)^2 = \frac{R_4}{R_1}\left(\frac{1 + y}{y}\right) \quad (16)$$

From equation 14 it follows that $$1 + r = (1 + y)(1 - r') \quad (17)$$

From equations 16 and 17, we get $$\left(\frac{1-r'}{r'}\right)^2 = \frac{R_4}{R_1}\frac{1}{y(1+y)}$$

or $$\frac{1-r'}{r'} = \pm\sqrt{\frac{R_4}{R_1}\frac{1}{y(1+y)}} \quad (18)$$

By combining equation 14 with the preceding equation, it is apparent that $$\frac{R_2}{R_1} = \frac{1}{y}\left(y\frac{1-r'}{r'}\right)^2$$

$$= y\left(\frac{1-r'}{r'}\right)^2$$

Substituting this value in equation 18, we have $$R_2 = R_4 \frac{1}{1+y} \quad (19)$$

If now we designate the right hand term of equation 18 as P and collect, we have as the design formulæ of the substation of Figs. 2, 3 or 4 the following:

$$\left. \begin{array}{l} R_2 = \dfrac{1}{1+y}R_4 \\[4pt] R_3 = \dfrac{1}{y}R_4 \\[4pt] \dfrac{1-r'}{r'} = \pm\sqrt{\dfrac{R_4}{R_1}\dfrac{1}{y(1+y)}} \\[4pt] 1+r = (1+y)(1-r') \end{array} \right\} (A)$$

It will be noted from the above formulæ that the resistance of the receiver and auxiliary resistances are expressed in terms of the resistance of the line and the constant $y$, while the ratios $r$ and $r'$ of the transformer windings are expressed in terms of the resistances of the line and transmitter and the constant $y$. Having chosen these three values the remaining elements of the substation may be readily determined.

Figure 6:
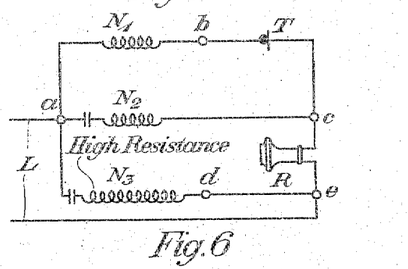
Figure 7:
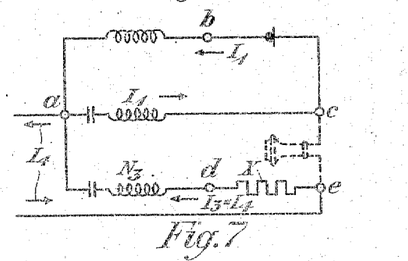
Figure 9:
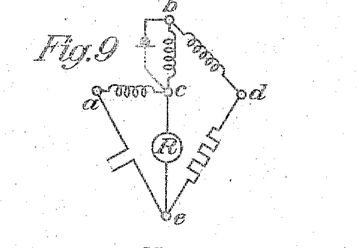

A modified form of substation is illustrated in Fig. 6 in which the transmitter is connected in series with the winding $N_1$ between terminals $a$ and $c$ and the winding $N_2$ is connected in parallel therewith between said terminals. The high resistance winding $N_3$ is connected between terminals $a$ and $e$ and the receiver is connected between terminals $c$ and $e$, while the line is connected to terminals $a$ and $e$. As stated in connection with Fig. 2, the high resistance winding $N_3$ may be replaced by a winding of negligible resistance and a separate resistance element $X$ as shown in Figs. 7 and 8. Condensers may be inserted in series with windings $N_2$ and $N_3$ so that direct current will flow from the line through winding $N_1$, transmitter $T$, receiver $R$ and back to the line.

The operation during transmission will be clear from Fig. 7. Since no current flows through the receiver $R$, the transmitter is in a local series circuit with windings $N_1$ and $N_2$ so that a variable potential applied at the transmitter causes a current $I_1$ to flow from terminal $c$ through the transmitter and through windings $N_1$ and $N_2$ to terminal $c$. An induced current $I_4$ equal to $I_3$ flows from terminal $a$ over the line to terminal $e$ and then through the auxiliary resistance $X$ and winding $N_3$ to terminal $a$. Potentials are induced in the transformer windings of such value and direction that points $c$ and $e$ are brought to the same potential so that no current flows through the receiver during transmission.

During reception, as indicated in Fig. 8, since no current flows through the auxiliary resistance, the receiver and line are in a series circuit and a potential applied to the line causes a current $I_4$ equal to $I_2$ to flow from terminal $c$ through the receiver $R$ and over the line $L$ to terminal $a$. A current $I_1$ flows from terminal $c$ through the transmitter $T$ and winding $N_1$ to terminal $a$, while a current $I_1+I_1$ flows from terminal $a$ through the winding $N_2$ to terminal $c$. Potentials are induced in the transformer windings of such value and direction that terminals $d$ and $e$ of the auxiliary resistance are at the same potential so that no current flows through said resistance.

A comparison of the diagrams of Figs. 1, 5, 9, 13, 17 and 21 shows that the several substations herein disclosed differ from each other only in the connections of the transformer windings. Referring to design formulæ A for the substation of Fig. 1, it will be seen that the expressions for the receiver resistance and auxiliary resistance, as given in the first two formulæ of the group, are independent of the ratios of the transformer windings so that these expressions will hold true for all of the substations herein disclosed. The remaining design formulæ for the substation of Fig. 6 may be determined from design formulæ A as follows:

Rewriting formulæ A we have $$\left. \begin{array}{l} R_2 = \dfrac{1}{1+y}R_4 \\[6pt] R_3 = \dfrac{1}{y}R_4 \\[6pt] r' = \dfrac{1}{1\pm\sqrt{\dfrac{R_4}{R_1}\dfrac{1}{y(1+y)}}} \\[10pt] r = (1+y)\dfrac{\pm\sqrt{\dfrac{R_4}{R_1}\dfrac{1}{y(1+y)}}}{1\pm\sqrt{\dfrac{R_4}{R_1}\dfrac{1}{y(1+y)}}} - 1 \end{array} \right\} (A')$$

Referring to Fig. 2, the number of turns of the transformer windings connecting terminals $a$ and $b$, $a$ and $c$ and $a$ and $d$, may be expressed as follows:

$$N_{ab} = n_1$$
$$N_{ac} = n_1 + n_2$$
$$N_{ad} = n_1 + n_3$$

The ratios $r$ and $r'$ of the transformer windings may then be expressed thus:

$$r = \frac{n_1}{n_3} = \frac{N_{ab}}{N_{ad} - N_{ab}}$$

$$r' = \frac{n_2}{n_3} = \frac{N_{ac} - N_{ab}}{N_{ad} - N_{ab}}$$

Substituting these values in formulæ A' and designating the expression $$\sqrt{\frac{R_4}{R_1} \frac{1}{y(1+y)}}$$

as P, we have as the general design formulæ for all of the substations herein disclosed the following:

$$\left. \begin{array}{l} R_2 = \dfrac{1}{1+y} R_4 \\[4pt] R_3 = \dfrac{1}{y} R_4 \\[4pt] \dfrac{N_{ac} - N_{ab}}{N_{ad} - N_{ab}} = \dfrac{1}{1+P} \\[4pt] \dfrac{N_{ab}}{N_{ad} - N_{ab}} = \dfrac{(1+y)P}{1+P} - 1 \end{array} \right\} \quad (B)$$

From inspection of Fig. 6 it will be seen that $$N_{ab} = n_1$$
$$N_{ac} = n_2$$
$$N_{ad} = n_3$$

Figure 5:
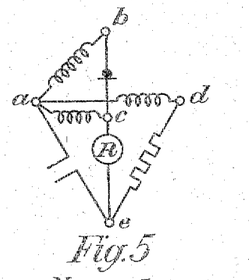

Substituting these values in the last two equations of formulæ B, we have as the corresponding formulæ for the substation of Fig. 5

$$\frac{n_2 - n_1}{n_3 - n_1} = \frac{1}{1+P}$$

$$\frac{n_1}{n_3 - n_1} = \frac{(1+y)P}{1+P} - 1$$

If $\frac{n_1}{n_3}$ be written as $r$, and $\frac{n_2}{n_3}$ be written as $r'$, we have as the design formulæ for the substation of Fig. 6, the following:

$$\left. \begin{array}{l} R_2 = \dfrac{1}{1+y} R_4 \\[4pt] R_3 = \dfrac{1}{y} R_4 \\[4pt] \dfrac{r' - r}{1 - r} = \dfrac{1}{1 - P} \\[4pt] \dfrac{r}{1 - r} = \dfrac{(1+y)P}{1+P} - 1 \end{array} \right\} \quad (C)$$

Figures 10, 11:
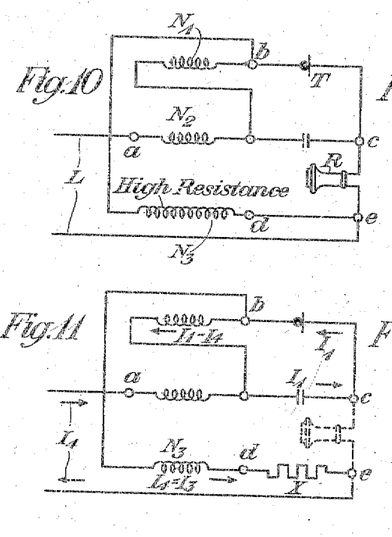

A still further modification is illustrated in Fig. 10. In accordance with this arrangement the transmitter T is connected between the terminals $b$ and $c$. The windings $N_1$ and $N_2$ are connected in series between terminals $a$ and $b$ and at their junction points are connected to terminal $c$ through a condenser. The winding $N_3$, which is of high resistance, is connected between terminals $b$ and $e$, and the receiver R is connected between terminals $c$ and $e$, while the line L is connected with terminals $a$ and $e$. Instead of a high resistance winding $N_3$ a separate resistance element X may be used as shown in Fig. 11, with a winding $N_3$ of negligible resistance connected in series therewith. Direct current from the line flows from terminal $a$ through windings $N_2$ and $N_1$ in series, to terminal $b$ where the current divides, part flowing through the high resistance winding $N_3$ to terminal $e$, and part flowing through the transmitter T and receiver R to said terminal, from which point the current returns again over the line L.

The operation during transmission is indicated in Fig. 11. The actuation of the transmitter causes a current $I_1$ to flow from the junction point of windings $N_1$ and $N_2$ through the condenser to terminal $c$ and through the transmitter T to terminal $b$. At terminal $b$ the current divides and a current $I_4$ equal to $I_3$ flows through the winding $N_3$, auxiliary resistance X and over the line L, to the terminal $a$, and thence through the winding $N_2$ to the junction point of windings $N_2$ and $N_1$. A current $I_1 - I_4$ flows in parallel therewith from the terminal $b$, through the winding $N_1$ to the junction point of windings $N_1$ and $N_2$. Potentials of such value and direction are induced in the transformer windings as will reduce the terminal $e$ to the same potential as terminal $c$, so that no current flows through the receiver.

Figure 12:
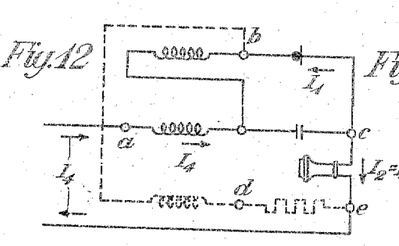
Figure 13:
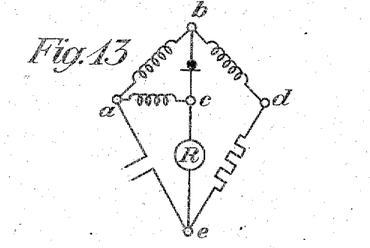

During reception, as indicated in Fig. 12, a current $I_4$ equal to $I_2$ flows from the line through the winding $N_2$ and the condenser to terminal $c$ and thence through the receiver R and back to the line L. An induced current $I_1$ flows from the terminal $c$, through the transmitter, winding $N_1$ and the condenser, back to terminal $c$. Potentials are induced in the windings of the transformer of such value and direction as to bring terminals $d$ and $e$ to the same potential, so that no current flows through the auxiliary resistance.

The design formulæ for this substation may be determined from the general design formulæ B, as follows: Comparing Fig. 10 with Fig. 2 it will be seen that the number of windings connecting terminals $a$ and $b$, $a$ and $c$ and $a$ and $d$, respectively, may be expressed as follows:

$$N_{ab} = n_1 + n_2$$
$$N_{ac} = n_2$$
$$N_{ad} = n_1 + n_2 - n_3$$

Solving the above equations for $n$ and $n_3$, we have $$N_{ac} - N_{ab} = -n$$
$$N_{ad} - N_{ab} = -n_3$$

Substituting these values in general design formulæ B and writing the ratio $\frac{n_1}{n_3}$ as $r$, and $\frac{n_2}{n_3}$ as $r'$, we have as the design formulæ for the substation of Fig. 10 the following:

$$\left. \begin{array}{l} r = \dfrac{1}{1+P} \\[4pt] r+r' = 1 - \dfrac{(1+y)P}{1+P} \\[4pt] R_2 = \dfrac{1}{1+y}R_4 \\[4pt] R_3 = \dfrac{1}{y}R_4 \end{array} \right\} \text{(D)}$$

Figures 14, 15, 16:
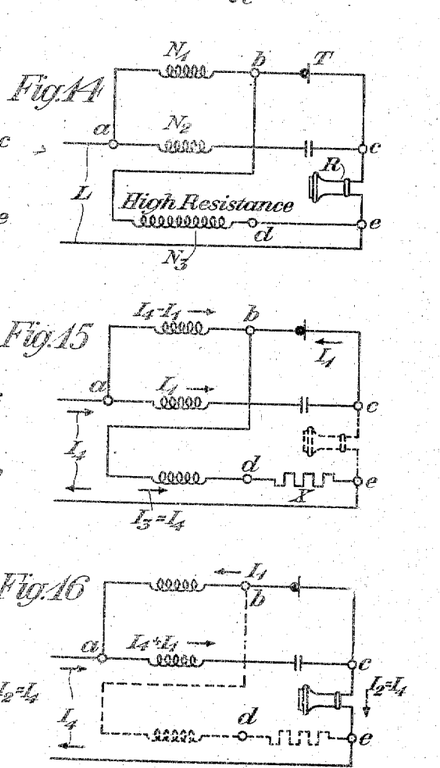

In the modification illustrated in Fig. 14, the transmitter T is connected in series with the winding $N_1$ between terminals $a$ and $c$, while the winding $N_2$ is connected in parallel therewith. The winding $N_3$ of high resistance is connected between terminals $b$ and $d$. The receiver R is connected between terminals $c$ and $e$ and the line L is connected between terminals $a$ and $e$. A condenser may be inserted in series with the winding $N_2$ to determine the path of the direct current flowing through the substation. The direct current from the line flows through the winding $N_1$ to terminal $b$, at which point the current divides, part flowing through the winding $N_3$ to terminal $e$ and part flowing through the transmitter T and receiver R to terminal $e$, from which point the current flows back over the line. The high resistance winding $N_3$ may be separated into a low resistance winding and a separate resistance element X as shown in Figs. 15 and 16.

The operation during transmission, as indicated in Fig. 15, is as follows:

The actuation of the transmitter causes a current $I_1$ to flow from terminal $a$, through the winding $N_2$ and the condenser in series therewith to terminal $c$, and thence through the transmitter T to terminal $b$. A current $I_4-I_1$ flows from terminal $a$, through the winding $N_1$ to terminal $b$. At terminal $b$ the two currents unite and a current $I_4$ equal to $I_4$ flows through winding $N_3$ and auxiliary resistance X to terminal $e$, from which point the current flows back over the line to terminal $a$. The potentials induced in the transformer windings are of such value and direction as to bring terminals $c$ and $e$ to the same potential, so that no current flows through the receiver.

During reception, as indicated in Fig. 16, since no current flows through the auxiliary resistance, the receiver and line are in a series circuit, so that a current $I_2$ equal to $I_4$ flows from terminal $c$, through the receiver R and over the line L, to terminal $a$. A current $I_1$ flows in parallel therewith from terminal $c$, through the transmitter T and winding $N_1$, to terminal $a$. At this point the currents unite and a current $I_4+I_1$ flows from terminal $a$, through the winding $N_2$ and the condenser, to terminal $c$. The potentials induced in the transformer windings reduce terminal $d$ to the same potential as terminal $e$, so that no current is wasted in the auxiliary resistance.

Comparing Fig. 14 with Fig. 2, it will be seen that the number of turns connecting terminals $a$ and $b$, $a$ and $c$ and $a$ and $d$, respectively, may be written as follows:

$$N_{ab} = n_1$$
$$N_{ac} = n_2$$
$$N_{ad} = n_1 + n_3$$

From the above equations it follows that $$N_{ac} - N_{ab} = n_2 - n_1$$

and $$N_{ad} - N_{ab} = n_3$$

Substituting these values in general design formulæ B and writing as before $\frac{n_1}{n_3}$ as $r$, and $\frac{n_2}{n_3}$ as $r'$, we have as the design formulæ for the substation of Fig. 14 the following:

$$\left. \begin{array}{l} r' - r = \dfrac{1}{1+P} \\[4pt] r = \dfrac{(1+y)P}{1+P} - 1 \\[4pt] R_2 = \dfrac{1}{1+y}R_4 \\[4pt] R_3 = \dfrac{1}{y}R_4 \end{array} \right\} \text{(E)}$$

Figures 17, 18:
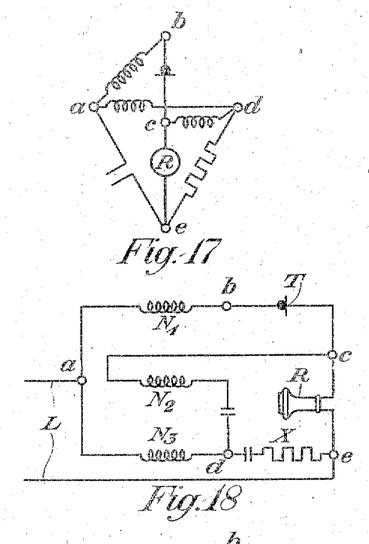

In the modification illustrated in Fig. 18, the transmitter T is connected in series with winding $N_1$ between terminals $a$ and $c$, the winding $N_2$ is connected between terminals $c$ and $d$ and the winding $N_3$ between terminals $a$ and $d$. The auxiliary resistance X is connected between terminals $d$ and $e$, the receiver R between terminals $c$ and $e$ and the line L between terminals $a$ and $e$. Condensers are inserted in series with the winding $N_2$ and the auxiliary resistance X, as indicated, to determine the path of direct current through the substation. Direct current from a distant source will flow over the line L, through the winding $N_1$, transmitter T, receiver R, to terminal $e$, and thence back over the line.

Figures 19, 20:
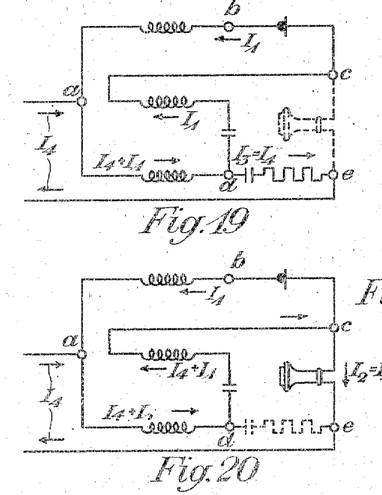
Figure 21:
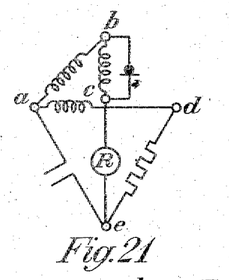

During transmission, as indicated in Fig. 19, a current $I_1$ flows from terminal $d$, through the winding $N_2$, transmitter T and winding $N_1$, to terminal $a$. A current $I_3$ equal to $I_4$ flows in parallel therewith from terminal $d$, through resistance X and over the line L, to terminal $a$. At this point the two currents combine and a current $I_4+I_1$ flows through the winding $N_3$ to terminal $d$. Potentials of such value and direction are induced in the windings of the transformer as to bring terminals $c$ and $e$ to the same potential, so that no current flows through the receiver during transmission.

During reception, as indicated in Fig. 20, a current $I_4$ equal to $I_2$ flows from terminal $c$, through the receiver R and over the line L, to terminal $a$, while a current $I_1$ flows in parallel therewith through the transmitter T and winding $N_1$ to terminal $a$. At terminal $a$ the currents combine and a current $I_4+I_1$ flows through the windings $N_3$ and $N_2$ in series to terminal $c$. Potentials are induced in the windings of the transformer whereby the terminals $d$ and $e$ are brought to the same potential, so that no current is wasted in the auxiliary resistance.

Comparing Figs. 18 and 2, it will be seen from Fig. 18 that the number of turns connecting terminals $a$ and $b$, $a$ and $c$ and $a$ and $d$, respectively, may be expressed as follows:

$$N_{ab} = n_1$$
$$N_{ac} = -n_2+n_3$$
$$N_{ad} = n_3$$

From the above it follows that $$N_{ac}-N_{ab} = -n_2+n_3-n_1$$

and $$N_{ad}-N_{ab} = n_3-n_1$$

Substituting these values in general design formulæ B and writing the ratios $\frac{n_1}{n_3}$ and $\frac{n_2}{n_3}$ as $r$ and $r'$, respectively, we have as the design formulæ for the substation of Fig. 18 the following:

$$\left.\begin{array}{c}\frac{1-r'-r}{1-r}=\frac{1}{1+P}\\[4pt]\frac{r}{1-r}=\frac{(1+y)P}{1+P}-1\\[4pt]R_2=\frac{1}{1+y}R_4\\[4pt]R_3=\frac{1}{y}R_4\end{array}\right\} (F)$$

Figures 22, 23, 24:
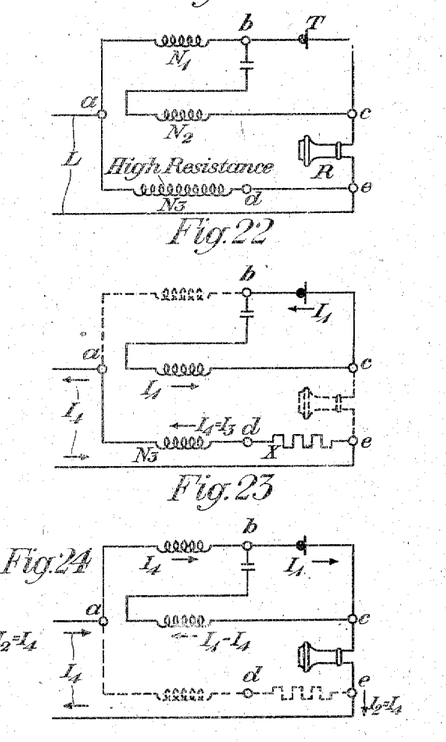

Still another form of substation is illustrated in Fig. 22 in which the transmitter T and the winding $N_2$ are connected in parallel between terminals $b$ and $c$, while the winding $N_1$ is connected between terminals $a$ and $b$. A high resistance winding $N_3$ is connected between terminals $a$ and $e$, the receiver R is connected between terminals $c$ and $e$ and the line L is connected between terminals $a$ and $e$ in parallel with the winding $N_3$. Instead of high resistance winding $N_3$, a low resistance winding and a separate resistance element X may be used as indicated in Figs. 23 and 24. A condenser may be inserted in series with the winding $N_2$, so that direct current from the line will flow from terminal $a$, through the winding $N_3$ to terminal $e$, and in parallel therewith, through the winding $N_1$, transmitter T and receiver R to terminal $e$, from which point the current flows back over the line.

During transmission, as indicated in Fig. 23, the actuation of the transmitter causes a current $I_1$ to flow in a local circuit, including the transmitter T, the condenser and winding $N_2$. An induced current $I_4$ equal to $I_3$ flows from terminal $a$, over the line, to terminal $e$ and thence through the resistance X and winding $N_3$ to terminal $a$. Potentials are induced in the transformer windings of such value and direction as to bring points $a$ and $b$ to the same potential and points $c$ and $e$ to the same potential, so that no current flows through the winding $N_1$ or the receiver R.

During reception, as indicated in Fig. 24, a current $I_4$ equal to $I_2$ flows from terminal $c$, through the receiver R, over the line L and through the winding $N_1$, to terminal $b$. A current $I_1-I_4$ flows in parallel therewith from terminal $c$ through the winding $N_2$ to the terminal $b$. At this point the two currents unite and a current $I_1$ flows through the transmitter from terminal $b$ to terminal $c$. Potentials are induced in the transformer windings of such value and direction as to bring terminals $d$ and $e$ to the same potential, so that no current is wasted in the auxiliary resistance.

Comparing Fig. 22 with Fig. 2, it will be seen that in the former the number of windings connecting terminals $a$ and $b$, $a$ and $c$ and $a$ and $d$ may be expressed as follows:

$$N_{ab} = n_1$$
$$N_{ac} = n_1+n_2$$
$$N_{ad} = n_3$$

From these equations it follows that $$N_{ac}-N_{ab} = n_2$$

and $$N_{ad}-N_{ab} = n_3-n_1$$

Substituting these values in the general design formulæ B and expressing the transformer ratios as $r$ and $r'$, we have as the design formulæ for the substation of Fig. 22 the following:

$$\left.\begin{array}{c}\frac{r'}{1-r}=\frac{1}{1+P}\\[4pt]\frac{r}{1-r}=\frac{(1+y)P}{1+P}-1\\[4pt]R_2=\frac{1}{1+y}R_4\\[4pt]R_3=\frac{1}{y}R_4\end{array}\right\} (G)$$

The type of substation disclosed above and illustrated in the accompanying drawing is but one of a large number employing only one transformer and one auxiliary resistance and all of these are ideal in the sense that they satisfy the fundamental requirements for an ideal substation, as stated heretofore in this specification. It will be understood therefore, that my invention is not limited to the specific embodiments herein illustrated, but is broadly directed to providing a substation comprising a single transformer and only one auxiliary element, which is so proportioned with reference to the line with which it is to be coöperatively combined, that it is ideally efficient and substantially without side tone. Furthermore, I do not desire to limit the design of the substations herein disclosed and illustrated to the accompanying design formulæ. These formulæ are derived on the assumption that ideal transformers are employed and that the component elements have no reactance, assumptions which are only approximately justified in practice. When particularly high precision is desired I may, therefore, proportion the substation more precisely by taking into account the fact that the transformer impedances are finite, and that the line and the various substation elements may have in general some reactance. The accompanying formulæ however, give quite satisfactory results, and the methods by which they are derived will enable one skilled in the art, to compute more precisely the substation constants when desired.

It will be understood that in the appended claims, where certain elements are said to be conjugate, or certain impedance relations are said to exist, since in practice these conditions can in general only be approximated, these expressions will be satisfied by structures substantially conforming thereto, especially where some compromise with respect to the rigid requirements is necessary in order to discriminate against line noise. It will also be understood that while I have specifically illustrated and described my invention as embodied in a telephone substation it is capable of many and varied embodiments which render it applicable in other kinds of signaling systems and consequently my invention is not to be limited to the particular form and use herein disclosed. It will be further understood that in this specification the word substation is employed in its generic sense and that consequently its significance is not limited to a subscriber's telephone station but embraces broadly a telephone station including a repeater station for relaying telephonic signals.

What is claimed is:

1. A signaling circuit comprising a three winding induction coil and four component elements consisting of a line, a transmitter, a receiver and an auxiliary resistance, three of said component elements having a common terminal, the remaining component element being serially connected to the opposite terminal of one of said elements and connected to the opposite terminal of the other two elements through the windings of said induction coil, said remaining component element being also shunted by at least a portion of the windings of said induction coil.

2. A signaling circuit comprising a three winding induction coil and four component elements consisting of a line, a transmitter, a receiver and an auxiliary resistance, three of said component elements having a common terminal, the remaining component element being serially connected to the opposite terminal of one of said elements and connected to the opposite terminal of the other two elements through the windings of said induction coil, said remaining component element being also shunted by at least a portion of the windings of said induction coil, said elements being so proportioned and related that the impedance of the combination comprising the line, receiver, auxiliary resistance and induction coil, as seen from the transmitter, is equal to the impedance of the transmitter.

3. A signaling circuit comprising a three winding induction coil and four component elements consisting of a line, a transmitter, a receiver and an auxiliary resistance, three of said component elements having a common terminal, the remaining component element being serially connected to the opposite terminal of one of said elements and connected to the opposite terminal of the other two elements through the windings of said induction coil, said remaining component element being also shunted by at least a portion of the windings of said induction coil, said elements being so proportioned and related that the impedance of the combination comprising the transmitter, receiver, auxiliary resistance and induction coil, as seen from the line, is equal to the impedance of the line.

4. A signaling circuit comprising a three winding induction coil and four component elements consisting of a line, a transmitter, a receiver and an auxiliary resistance, three of said component elements having a common terminal, the remaining component element being serially connected to the opposite terminal of one of said elements and connected to the opposite terminal of the other two elements through the windings of said induction coil, said remaining component element being also shunted by at least a portion of the windings of said induction coil, said elements being so proportioned and related that the receiver and transmitter are conjugate.

5. A signaling circuit comprising a three winding induction coil and four component elements consisting of a line, a transmitter, a receiver and an auxiliary resistance, three of said component elements having a common terminal, the remaining component element being serially connected to the opposite terminal of one of said elements and connected to the opposite terminal of the other two elements through the windings of said induction coil, said remaining component element being also shunted by at least a portion of the windings of said induction coil, said elements being so proportioned and related that the auxiliary resistance and line are conjugate.

6. A signaling circuit comprising a three winding induction coil and four component elements consisting of a line, a transmitter, a receiver and an auxiliary resistance, three of said component elements having a common terminal, the remaining component element being serially connected to the opposite terminal of one of said elements and connected to the opposite terminal of the other two elements through the windings of said induction coil, said remaining component element being also shunted by at least a portion of the windings of said induction coil, said elements being so proportioned and related that the impedance of the combination comprising the line, receiver, auxiliary resistance and induction coil, as seen from the transmitter, is equal to the impedance of the transmitter, the impedance of the combination comprising the transmitter, receiver, auxiliary resistance and induction coil, as seen from the line, is equal to the impedance of the line, the receiver and transmitter are conjugate and the auxiliary resistance and line are conjugate.

7. A signaling circuit comprising a three winding induction coil and four component elements consisting of a path for the transmission and reception of signals, a path including a transmitting apparatus, a receiving apparatus, and a path including balancing impedance, one of said three paths including a winding of said induction coil, said second mentioned path being shunted by at least a portion of the windings of said induction coil, said receiving apparatus being in a series circuit including said second mentioned path, and said receiving apparatus and the other paths having a common terminal.

8. A signaling circuit comprising a three winding induction coil and four component elements consisting of a path for the transmission and reception of signals, a path including a transmitting apparatus, a receiving apparatus, and a path including balancing impedance, one of said three paths including a winding of said induction coil, said second mentioned path being shunted by at least a portion of the windings of said induction coil, said receiving apparatus being in a series circuit including said second mentioned path, and said receiving apparatus and the other paths having a common terminal, said elements being so proportioned and related that the impedance of the combination comprising said induction coil, said receiving apparatus and said first and third mentioned paths, as seen from the second mentioned path, is equal to the impedance of said second mentioned path.

9. A signaling circuit comprising a three winding induction coil and four component elements consisting of a path for the transmission and reception of signals, a path including a transmitting apparatus, a receiving apparatus, and a path including balancing impedance, one of said three paths including a winding of said induction coil, said second mentioned path being shunted by at least a portion of the windings of said induction coil, said receiving apparatus being in a series circuit including said second mentioned path, and said receiving apparatus and the other paths having a common terminal, said elements being so proportioned and related that the impedance of the combination comprising said induction coil, said receiving apparatus and said second and third mentioned paths, as seen from said first mentioned path, is equal to the impedance of said first mentioned path.

10. A signaling circuit comprising a three winding induction coil and four component elements consisting of a path for the transmission and reception of signals, a path including a transmitting apparatus, a receiving apparatus, and a path including balancing impedance, one of said three paths including a winding of said induction coil, said second mentioned path being shunted by at least a portion of the windings of said induction coil, said receiving apparatus being in a series circuit including said second mentioned path, and said receiving apparatus and the other paths having a common terminal, said elements being so proportioned and related that said receiving apparatus and said path including a transmitting apparatus are conjugate.

11. A signaling circuit comprising a three winding induction coil and four component elements consisting of a path for the transmission and reception of signals, a path including a transmitting apparatus, a receiving apparatus, and a path including balancing impedance, one of said three paths including a winding of said induction coil, said second mentioned path being shunted by at least a portion of the windings of said induction coil, said receiving apparatus being in a series circuit including said second mentioned path, and said receiving apparatus and the other paths having a common terminal, said elements being so proportioned and related that said path including balancing impedance and said first mentioned path are conjugate.

12. A signaling circuit comprising a three winding induction coil and four component elements consisting of a path for the transmission and reception of signals, a path including a transmitting apparatus, a receiving apparatus, and a path including balancing impedance, one of said three paths including a winding of said induction coil, said second mentioned path being shunted by at least a portion of the windings of said induction coil, said receiving apparatus being in a series circuit including said second mentioned path, and said receiving apparatus and the other paths having a common terminal, said elements being so proportioned and related that the impedance of the combinations comprising said induction coil, said receiving apparatus and said first and third mentioned paths, as seen from the second mentioned path, is equal to the impedance of said second mentioned path, the impedance of the combination comprising said induction coil, said receiving apparatus and said second and third mentioned paths, as seen from said first mentioned path, is equal to the impedance of said first mentioned path, said receiving apparatus and said path including a transmitting apparatus are conjugate and said path including balancing impedance and said first mentioned path are conjugate.

In testimony whereof, I have signed my name to this specification this 9th day of August, 1917.

GEORGE A. CAMPBELL.